Patented Dec. 6, 1938

2,139,360

UNITED STATES PATENT OFFICE 2,139,360

PRODUCTION OF UNSATURATED KETONES

Alasdair W. Fairbairn and William Engs, Oakland, Calif., assignors to Shell Development Company, San Francisco, Calif., a corporation of Delaware No Drawing. Application April 6, 1937, Serial No. 135,268

18 Claims. (Cl. 260—596)

The present invention relates to the continuous production of unsaturated ketones by the dehydration of their corresponding keto-alcohols, as illustrated by the production of mesityl oxide from diacetone alcohol. More particularly, it deals with a continuous system wherein a top product is removed at a rate corresponding to the feed introduced so that after initiation of operations, the reaction composition is maintained substantially constant in composition and volume.

Further, our invention deals with a reaction mixture undergoing distillation wherein the unsaturated ketone:water ratio is maintained at a value greater than that established by the dehydation reaction per se. Still further, our invention deals with a recoverable top product which contains unsaturated ketone and water in a ratio greater than that prevailing in the corresponding binary azeotrope.

Our invention also resides in the control of the reflux composition and ratio wherein the preponderating reflux liquid is unsaturated ketone. It also deals with the use of a stratified unsaturated ketone phase, obtained by condensation of distillate, as refluxing medium. It is an object of our invention to employ as refluxing medium a mixture of unsaturated ketone and water possessing a molal ratio of unsaturated ketone to water greater than one and preferably a ratio greater than that prevailing in the distillate.

It is another object of our invention to operate under a still-head temperature which is maintained above the boiling temperature of the binary unsaturated ketone-water azeotrope.

Diacetone alcohol, which is representative of the class of keto-alcohols, is customarily dehydrated in the presence of a dehydration catalyst, preferably at an elevated temperature. Suitable catalysts are: iodine, hydrochloric acid, tungstic acid, sulfuric acid, phosphoric acid, primary sodium phosphate, zinc chloride, zinc oxide, chromium oxide, aluminum oxide, aluminum phosphate, oxalic acid, calcium chloride, sodium acid sulfate, etc. We prefer to employ the alkaline acid salts, such as the alkali metal acid sulfates, as they do not possess as strong resinifying properties as the acids per se.

It has been the prevalent belief that the catalysts must be employed in dilute aqueous solutions. Such practice, apparently, is traceable to the experimental work prior to 1900 when it was determined that large volumes of sulfuric acid readily resinified a large portion of the formed mesityl oxide at room temperatures.

It still is the belief that water must be added to the reaction system to supplement the water of reaction in distilling off the mesityl oxide, as formed, as the binary azeotrope.

Guinot, in his U. S. Patent 1,913,159, stresses the occurrence of condensation and depolymerization reactions when extraneous water is not supplied to the reaction system. He recommends that the reaction system contain a "considerable excess of water containing a small quantity of catalyst", page 1, lines 47–48. According to the patentee, "it is necessary to return to the reaction vessel the excess water entrained by the azeotropic mixture" to maintain constant the composition of the reacting mixture and to ensure the continuous formation and removal of the binary mesityl oxide-water azeotrope as top product.

The reaction involving the dehydration of diacetone alcohol is:

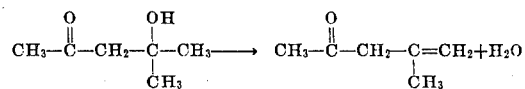

Thus, for every molecule of mesityl oxide formed there is simultaneously produced a molecule of water, i. e., the reaction mixture contains a mesityl oxide:water ratio of 5.44:1. The binary mesityl oxide-water azeotrope contains, on a weight basis, a corresponding ratio of 2.33:1. According to the patentee's teachings and operations, it is necessary to provide for the removal of the excess of the stoichiometric quantity of mesityl oxide formed by supplying additional water to the system so that the mesityl oxide:water ratio is continuously maintained at 2.33:1. In other words, the reaction system is to contain at all times about one molecule of water per 0.4 molecules of mesityl oxide. Under such conditions, the reaction system is 2.5 times "wetter" than normal.

We have found that by departing from prior art teachings we can continuously manufacture unsaturated ketones under more practical and efficient conditions. We have found that it is not necessary to supply make-up water to the reaction system and that it is not desirable to take off an overhead product consisting of the binary mesityl oxide-water azeotrope.

Our invention comprises feeding diacetone alcohol (either crude or pure and preferably substantially anhydrous) continuously to a heated reaction zone containing a small quantity of dehydration catalyst. The kettle temperature is sufficiently high to ensure the distillation of mesityl oxide, being about 125–130° C. in the case of a pure feed and about 130–135° C. in the case of a crude feed. The mesityl oxide is continuously distilled off with water in a ratio much greater than 2.33:1. The overhead product is condensed and stratifies into two phases in a decanter. As fast as the water phase separates out in the decanter, it is removed from the system. To prevent diacetone alcohol from distilling overhead, a reflux is supplied from the upper mesityl oxide phase—the remainder of said phase being removed for finishing treatments. Under a reflux ratio of about 0.5:1, the distillate or overhead product contains 89% mesityl oxide and 11% water, by weight, or a ratio of about 8.8:1. Under a reflux ratio of 1:1 the distillate contains 91.5% mesityl oxide and 8.5% water, by weight, or a ratio of about 10.8:1.

Thus, by refluxing with mesityl oxide, the reaction system is actually much "drier" than normal.

The following information is available from a continuous run conducted with 2.89 mols. of pure diacetone (335 pounds) and employing 200 grams of NaHSO$_4$ as the dehydration catalyst. 92.1% (molal basis) of the diacetone alcohol was recovered as mesityl oxide, the difference being due to handling loss and a reversion of 3.7% to acetone. The upper mesityl oxide phase contained 92% mesityl oxide, 4% acetone and 4% water. The still-head temperature was 110–115° C., while that of the reaction column at the base of the distillation column was 125–130° C.

It is evident that a reflux supplied from such an upper phase contained a ratio of mesityl oxide:water equal to 23:1, i. e., the mesityl oxide:water ratio in the reaction kettle is maintained at a value between 5.44–23:1. Thus, the dehydration of diacetone alcohol may be successfully executed under "dryer" conditions than normal.

The new method of operation possesses many advantages over the old. It requires the distillation of much less water, permitting a greater throughput in a given apparatus and a much lower heat input. It is much smoother and simpler to operate because there is no stream of water constantly entering the reaction zone, small variations in which greatly disturb the operation of the unit.

Although we have stressed the production of mesityl oxide from diacetone alcohol, we do not limit ourselves thereto as the underlying broad principles are applicable generally to any process wherein a keto-alcohol is dehydrated to an unsaturated ketone, provided that the condensate is stratifiable into two phases. Thus, for example, our process may be practiced to obtain methyl vinyl ketone from 3-hydroxy butanone-2, methyl allyl ketone from 4-hydroxy pentanone-2, methyl isopropenyl ketone from 3-methyl 4-hydroxy butanone-2, 3-methyl pentene-3-one-2 from 3-methyl 4 hydroxy pentanone-2, 5-methyl hexene-4-one-2 from 5-methyl 4-hydroxy hexanone-2, 3-ethyl pentene-3-one-2 from 3-ethyl 4-hydroxy pentanone-2, diisobutenyl ketone from 2,6-methyl 2,6-hydroxy heptanone-4, 2-hydroxymethyl butene-3-one-2 from alpha, alpha-dimethylol acetone, 3-methyl heptene-3-one-5 from 3-methyl 3-hydroxy heptanone-5, 2,5-dimethylene cyclohexanone from 2,5-dimethylol cyclohexone, and the corresponding unsaturated ketones from homologues, analogues and substitution products of such ketols.

The saturated ketone which is obtained as reversion product in small amounts may be recovered from the unsaturated ketone, as by distillation, and recycled to a condensation system for the preparation of keto-alcohols.

It is also possible to minimize the reversion effect by shortening the time of residence. This may be accomplished by imparting the endothermic heat units required to the keto-alcohol feed. Thus, a vaporized feed may be employed.

Solid dehydrating catalysts, with or without suitable carriers, may be employed, preferably with vaporized feeds.

It is within the scope of our invention when a minor quantity of condensate aqueous phase is employed with a major quantity of condensate unsaturated ketone phase as reflux so long as the system is operated "drier" than normal as defined.

In addition, the unsaturated ketone phase or refluxing composition may be returned to the distillation column via a drying unit wherein water is removed from the refluxing medium.

I claim as my invention:

1. In a continuous distillation process for the production of an unsaturated ketone from the corresponding keto-alcohol in the presence of a dehydrating catalyst, the step of employing as reflux medium the stratified unsaturated ketone phase obtained by condensation of the distillate.

2. In a continuous distillation process for the production of an unsaturated ketone from the corresponding keto-alcohol in the presence of a dehydrating catalyst, the step of maintaining as a distillate directly from the reaction zone an overhead product containing a ratio of unsaturated ketone to water which is greater than that prevailing in the corresponding binary azeotrope.

3. In a continuous distillation process for the production of an unsaturated ketone from the corresponding keto-alcohol in the presence of a dehydrating catalyst, the step of controlling the reflux composition and ratio so as to maintain a still-head temperature above the boiling temperature of the binary unsaturated ketone-water azeotrope.

4. In a continuous distillation process for the production of an unsaturated ketone from the corresponding keto-alcohol in the presence of a dehydrating catalyst, the step of maintaining a ratio of unsaturated ketone to water in the reaction zone greater than the stoichiometric.

5. In a continuous distillation process for the production of an unsaturated ketone from the corresponding keto-alcohol in the presence of a dehydrating catalyst, the step of maintaining a molal excess of unsaturated ketone over water in the reaction system.

6. In a continuous distillation process for the production of an unsaturated ketone from the corresponding keto-alcohol in the presence of a dehydrating catalyst, the step of employing as reflux medium a mixture of unsaturated ketone and water possessing a molal ratio of unsaturated ketone to water greater than one.

7. In a continuous distillation process for the production of an unsaturated ketone from the corresponding keto-alcohol in the presence of a dehydrating catalyst, the step of employing as reflux medium a mixture of unsaturated ketone and water possessing a weight ratio of unsaturated ketone to water greater than that prevailing in the distillate.

8. In a continuous distillation process for the production of mesityl oxide from diacetone alcohol in the presence of a dehydrating catalyst, the step of employing as reflux medium the stratified mesityl oxide phase obtained by condensation of the distillate.

9. In a continuous distillation process for the production of mesityl oxide from diacetone alcohol in the presence of a dehydrating catalyst, the step of maintaining as a distillate directly from the reaction zone an overhead product containing a ratio of mesityl oxide to water which is greater than that prevailing in the corresponding binary azeotrope.

10. In a continuous distillation process for the production of mesityl oxide from diacetone alcohol in the presence of a dehydrating catalyst, the step of controlling the reflux composition and ratio so as to maintain a still-head temperature above the boiling temperature of the binary mesityl oxide-water azeotrope.

11. In a continuous distillation process for the production of mesityl oxide from diacetone alcohol in the presence of a dehydrating catalyst, the step of maintaining a ratio of mesityl oxide to water in the reaction system greater than the stoichiometric.

12. In a continuous distillation process for the production of mesityl oxide from diacetone alcohol in the presence of a dehydrating catalyst, the step of maintaining a molal excess of mesityl oxide over water in the reaction system.

13. In a continuous distillation process for the production of mesityl oxide from diacetone alcohol in the presence of a dehydrating catalyst, the step of employing as reflux medium a mixture of mesityl oxide and water possessing a molal ratio of mesityl oxide to water greater than one.

14. In a continuous distillation process for the production of mesityl oxide from diacetone alcohol in the presence of a dehydrating catalyst, the step of employing as reflux medium a mixture of mesityl oxide and water possessing a weight ratio of mesityl oxide to water greater than that prevailing in the distillate.

15. In a continuous distillation process for the production of mesityl oxide from diacetone alcohol in the presence of a dehydrating catalyst, the step of controlling the reflux composition and ratio so as to maintain a still-head temperature not substantially less than 110° C.

16. In a continuous distillation process for the production of mesityl oxide from diacetone alcohol in the presence of a dehydrating catalyst, the step of employing as reflux medium a mixture of mesityl oxide and water possessing a mesityl oxide to water weight ratio materially greater than 5.44:1.

17. In a continuous distillation process for the production of mesityl oxide from diacetone alcohol in the presence of a dehydrating catalyst, the step of maintaining as a distillate an overhead product containing a weight ratio of mesityl oxide to water which is materially greater than 2.33:1, said distillate being derived directly from the reaction mixture.

18. In a continuous distillation process for the production of mesityl oxide from diacetone alcohol in the presence of a dehydrating catalyst, the step of maintaining a weight ratio of mesityl oxide to water in the reaction system materially greater than 5.44:1.

ALASDAIR W. FAIRBAIRN.
WILLIAM ENGS.